(12) United States Patent
Kim

(10) Patent No.: US 7,380,304 B2
(45) Date of Patent: Jun. 3, 2008

(54) WASHING MACHINE CONTROL METHOD

(75) Inventor: Young Soo Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 10/720,748

(22) Filed: Nov. 25, 2003

(65) Prior Publication Data
US 2004/0154644 A1    Aug. 12, 2004

(30) Foreign Application Priority Data
Nov. 28, 2002    (KR) .................. 10-2002-0074987

(51) Int. Cl.
*D06F 35/00*    (2006.01)
(52) U.S. Cl. .................. 8/158; 68/12.04; 68/12.05
(58) Field of Classification Search .................. 8/158, 8/159; 134/18; 68/12.05, 12.04
See application file for complete search history.

(56) References Cited

U.S. PATENT DOCUMENTS

| 4,303,406 A | * | 12/1981 | Ross | .................. | 8/158 |
| 5,768,729 A | * | 6/1998 | Cracraft | .................. | 8/158 |
| 6,842,929 B2 | * | 1/2005 | Kim et al. | .................. | 8/159 |
| 2003/0041390 A1 | * | 3/2003 | Kim et al. | .................. | 8/158 |

FOREIGN PATENT DOCUMENTS

KR             99027766 A    *    4/1999

* cited by examiner

*Primary Examiner*—Alexander Markoff
(74) *Attorney, Agent, or Firm*—McKenna Long & Aldridge LLP

(57) ABSTRACT

A water supply method of a washing machine optimizes a washing performance by sufficiently supplying water according to an amount and type of laundry. The method includes steps of setting first and second water levels based on an amount and type of laundry in a washing machine; supplying water to the washing machine according to the set first water level; sensing a current water level to determine a degree of absorption of the water into the laundry during a predetermined time, the degree of absorption being determined by comparing the currently sensed water level to the second water level; re-supplying water to the washing machine to compensate for the degree of absorption; resetting the second water level according to a comparison of a water re-supply count to a predetermined value; and performing washing if the currently sensed water level is greater than the second water level. The resetting of the second water level is performed by increasing the set second water level if the water re-supply count is greater than the predetermined value.

12 Claims, 2 Drawing Sheets

WASHING MACHINE CONTROL METHOD

This application claims the benefit of Korean Application No. 10-2002-0074987 filed on Nov. 28, 2002, which is hereby incorporated by reference.

BACKGROUND OF THE INVENTION

1. Field of the Invention

The present invention relates to a washing machine, and more particularly, to a washing machine control method enabling a resetting of a water re-supply level by determined a water re-supply count for a predetermined time.

2. Discussion of the Related Art

Generally speaking, to perform washing using a washing machine in which laundry has been placed, a wash course is selected to determine a wash pattern, water is supplied to the washing machine according a predetermined water level based on the amount of laundry in the washing machine, and washing is performed based on the predetermined water level. After the water reaches the predetermined level, however, the laundry absorbs a portion of the water, which soon lowers the water level. To compensate for the water level being lowered as above, a washing machine control method according to a related art introduces an additional supply of water before proceeding with the washing step, so that the predetermined water level is maintained. Such a method is illustrated in FIG. 1.

Referring to FIG. 1, the method of the related art achieves the supply of water to a washing machine through the steps of setting water levels W1 and W2 based on an amount and type of laundry in the washing machine, where the water level W1 is the desired water level and the water level W2 is a predetermined reduced level requiring the re-supply of water to avoid damage to the laundry and to achieve a satisfactory washing performance (S101); supplying water to the washing machine according to the water level W1 and a selected wash course (S102); determining whether the level of the water in the washing machine has, due to absorption or other factors, been reduced to the water level W2, i.e., whether the water level has fallen to a substantially lower level that necessitates the supply of additional water (S103); re-supplying the washing machine with a predetermined amount of water, based on the desired water level W1, to raise the water level above the "re-supply" water level W2 (S104); and performing washing using the water of the current level, which is between the levels W1 and W2 defining the extremes of a hysteresis loop, whereupon it is determined that the water is sufficiently absorbed into the laundry and that the water supply step is therefore completed (S105). The water re-supplying step continues until a completion of the water supply, such that washing may proceed. To determine whether to re-supply an amount of water, the water is continuously monitored using a water level sensor, which senses a water pressure of the water in the washing machine.

As described above, at the time of proceeding with the washing step, the level of the water in the washing machine is equal to a level between the initially set water levels W1 and W2, i.e., within a predetermined range. That is, the upper and lower limits of the water level for proceeding the washing step are set before water is supplied to the washing machine, where the upper limit is set as a predetermined maximum assuming no reduction in the water level due to absorption and other factors and the lower limit is set as a predetermined minimum level for proceeding the washing.

Meanwhile, an optimal water level for washing varies according to the amount and type of laundry placed in the washing machine, but the amount and type of laundry may result in an excessive degree of absorption.

Therefore, if there is excessive water absorption it may be impossible to reach a satisfactory water level since the water re-supply level W2 is set too low. That is, if, due to a large laundry load and/or very absorbent laundry, the optimal water level is much higher than the water re-supply level W2 as initially set, it is very likely that the water level achieved by the washing machine control method of the related art will be significantly lower than the desired water level. When the water level is too low, washing performance is degraded and the laundry is vulnerable to damage.

SUMMARY OF THE INVENTION

Accordingly, the present invention is directed to a washing machine control method that substantially obviates one or more of the problems due to limitations and disadvantages of the related art.

An object of the present invention, which has been devised to solve the foregoing problem, lies in providing a washing machine control method, which optimizes a washing performance by sufficiently supplying water according to an amount and type of laundry placed in a washing machine.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a washing machine control method comprising steps of setting first and second water levels based on an amount and type of laundry in a washing machine; supplying water to the washing machine according to the set first water level; sensing a current water level to determine a degree of absorption of the water into the laundry during a predetermined time; re-supplying water to the washing machine to compensate for the degree of absorption; and resetting the second water level according to a comparison of a water re-supply count to a predetermined value.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations where possible.

Figure 1:
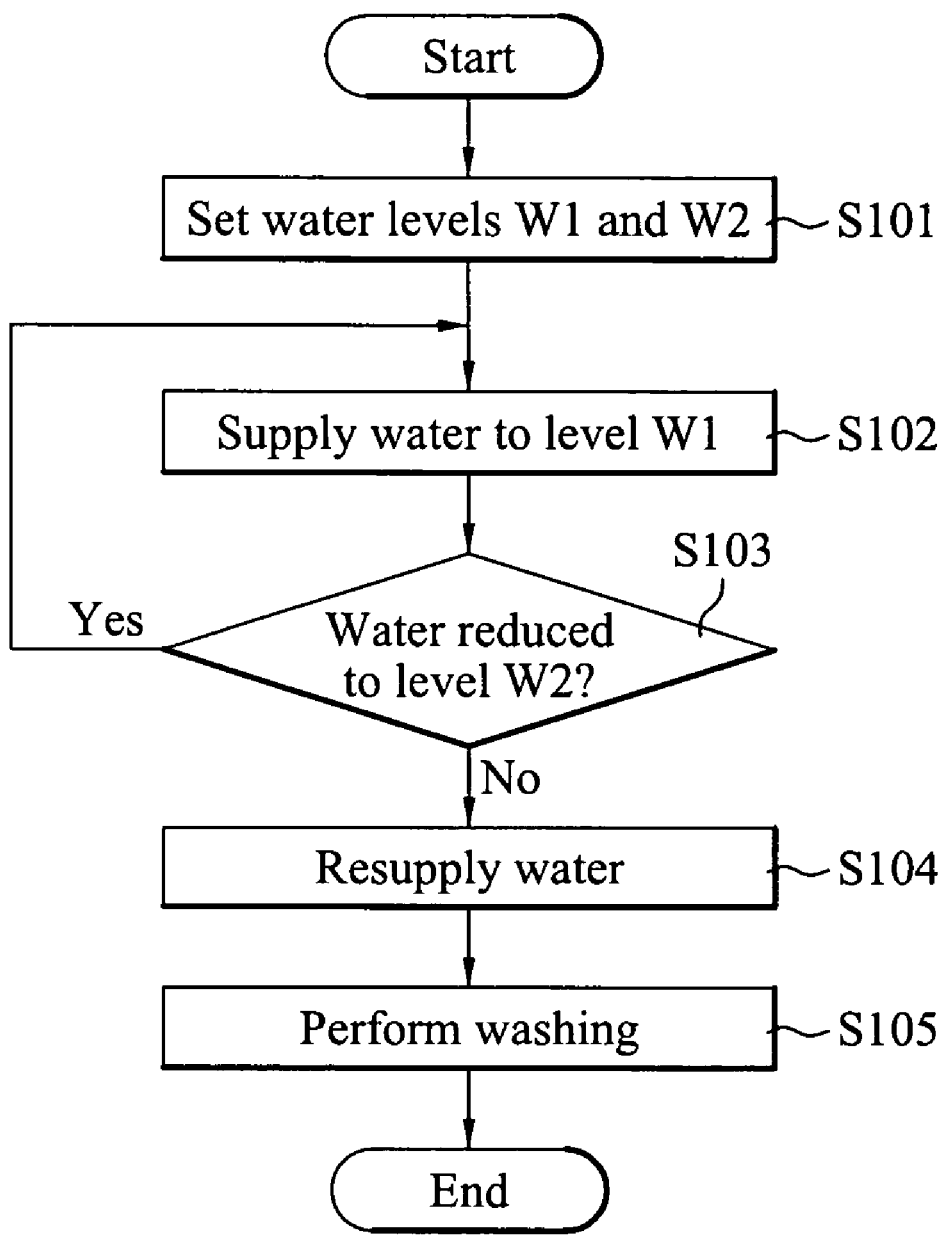
FIG. 1 is a flowchart of a washing machine control method according to a related art.
Figure 2:
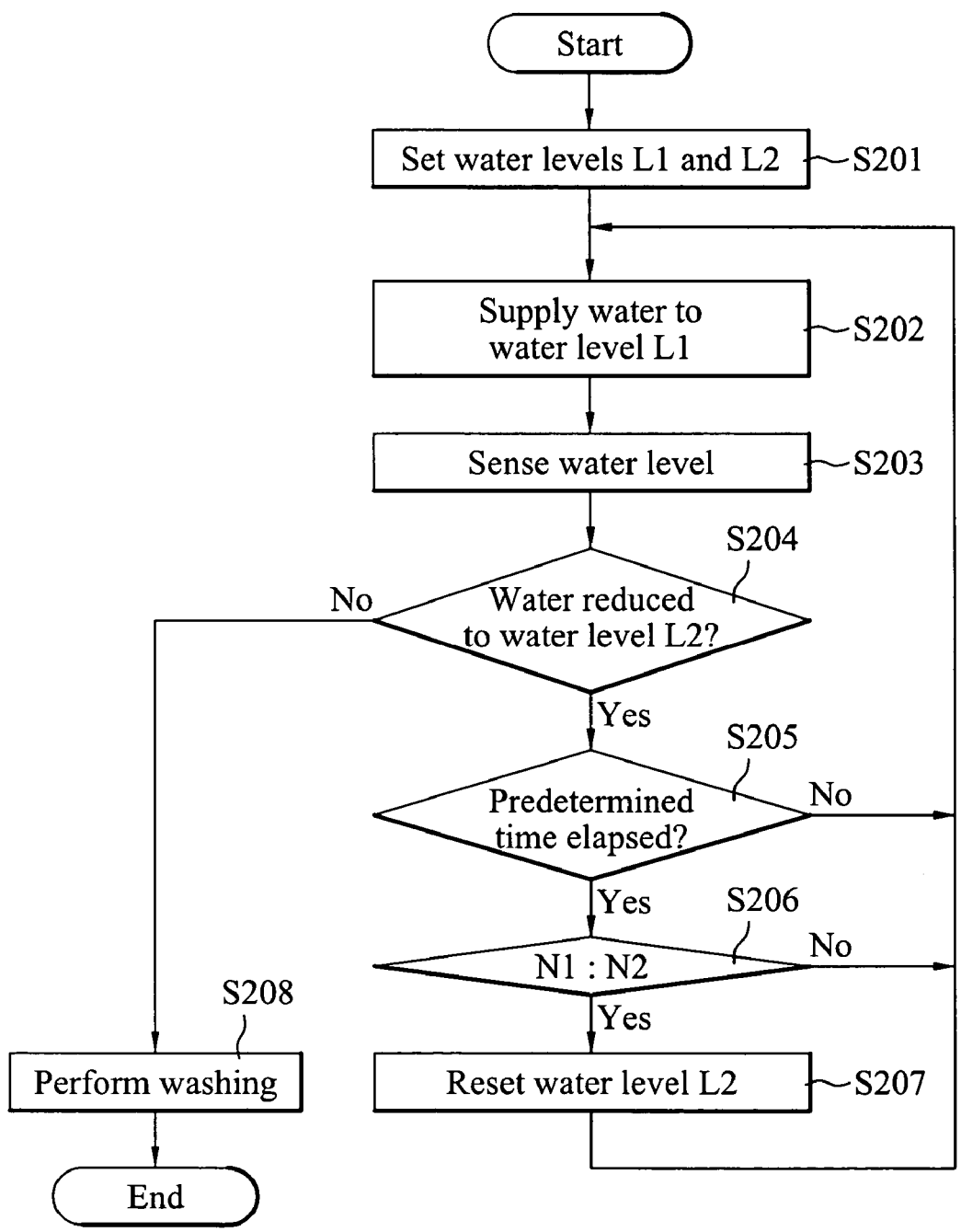
FIG. 2 is a flowchart of a washing machine control method according to the present invention.

Referring to FIG. 2, illustrating a washing machine control method according to the present invention, water levels L1 and L2 are set (S201) based on an amount and type of laundry in a washing machine, where the water level L1 is the desired water level and the water level L2 is a predetermined reduced level requiring the re-supply of water to avoid damage to the laundry and to achieve optimum washing performance. Then, an initial water is supplied (S202) to the washing machine according to the water level L1 and a selected wash course. Upon reaching the water level L1, the water supply is stopped so that washing may be initiated.

Once the initial water supply is completed, the water level is sensed (S203) by a water level sensor outputting a sensed water level signal to a microcomputer of the washing machine. The water level is sensed to determine (S204) whether the water has been reduced by a predetermined amount that precludes washing, i.e., the water level L2 is reached. In doing so, the microcomputer compares a value corresponding to the sensed water level signal to a value stored in a lookup table. If a difference in the compared values indicates no significant reduction in the water level, the sensed water level is deemed appropriate, and washing is performed (S208).

On the other hand, if the comparison indicates a significant reduction in the water level, such that the water in the washing machine is at or below the water level L2, water will be re-supplied to the washing machine according to the steps S202 and S203. In doing so, however, it is determined using a timer and counter of the microcomputer whether a predetermined time has elapsed since the initial supply of water based on a count N1 of water re-supply steps (S205, S206). When the count exceeds a predetermined number N2 of water re-supply steps, the microcomputer resets (S207) the water re-supply level L2, increasing the minimum water level for proceeding the washing step. The predetermined number is preferably low, for example, two or three, so that there is no unreasonable interruption of the wash cycle.

In more detail, the initially set water re-supply level L2 is maintained when re-supplying the water to the water supply level L1, until the water re-supply count N1 for the predetermined time exceeds the predetermined number N2. That is, it is determined that there is only a small degree of absorption as long as the value of N1 is less than or equal to the value of N2; however, as soon as N1 surpasses N2, it is determined that absorption has occurred to an excessive degree, such that the water re-supply level L2 should be redefined, whereby the water is re-supplied to the washing machine according to the water level L1, after resetting (increasing) the water re-supply level L2. This increase in the value of L2 is due to the need for a much greater supply of water to perform the washing step and a determination that the optimal water level is significantly higher than the initially set water re-supply level L2. When the water re-supply level L2 is thus reset, the water re-supply count N1 has already surpassed the predetermined number N2, by which time it can be assumed that the laundry is sufficiently soaked in the water and a completion of the water supply has been achieved completion requiring no further water re-supply.

Meanwhile, the present invention provides for a further optimization of the washing performance by enabling a resetting of the selected wash course during the washing cycle, by using the information of the water re-supply count N1 to facilitate the sensing of the laundry amount. That is, the laundry amount may be adjusted upward (set higher) for higher values of the water re-supply count N1, meaning that more laundry is absorbing more water, and may be adjusted downward (set lower) for lower values of the water re-supply count N1, meaning that less laundry is absorbing less water.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A washing machine control method comprising steps of:
   setting a first water level and an initial second water level based on an amount and type of laundry in a washing machine;
   supplying water to the washing machine to the set first water level;
   determining an amount of water absorbed by the laundry during a predetermined time period by sensing a current water level in the washing machine after the predetermined time period has elapsed;
   re-supplying water to the washing machine when the sensed current water level drops below the initial second water level, wherein the operation of re-supplying water compensates for the amount of water absorbed by the laundry;
   counting a number of times water is re-supplied to the washing machine;
   comparing the number of times water is re-supplied to a predetermined number;
   resetting the initial second water level to a reset second water level based on the comparison;
   repeating the step of supplying water to the washing machine to the set first water level;
   sensing a new water level in the washing machine; and
   re-supplying water to the washing machine when the new water level is reduced to the reset second water level.

2. The method as claimed in claim 1, wherein said resetting step is performed by increasing the set initial second water level if the water re-supply count is greater than the predetermined number.

3. The method as claimed in claim 1, wherein a microprocessor of the washing machine determines if a predetermined amount of time has elapsed since the water was supplied to the first water level.

4. The method as claimed in claim 1, wherein the predetermined number is two.

5. The method as claimed in claim 1, wherein the predetermined number is three.

6. The method as claimed in claim 1, wherein the amount of water absorbed by the laundry is determined by comparing the currently sensed water level to the initial second water level.

7. The method as claimed in claim 6, further comprising:
initializing washing the laundry if the sensed current water level is greater than the initial second water level.

8. The method as claimed in claim 1, further comprising:
selecting a wash course based on the first water level and the initial second water level; and
resetting the selected wash course based on the number of times the water is re-supplied to the washing machine.

9. A method of controlling a washing machine comprising:
setting an initial water level based on a load of laundry in a tub of the washing machine;
filling the tub with water to the initial water level;
over a predefined period of time, periodically measuring a current water level, wherein the current water level relates to an amount of water absorbed by the load of laundry;
determining if the current water level is below a minimum water level;
re-filling the tub with water to the initial water level if it is determined that the current water level drops below the minimum water level;
counting a number of times the tub has been refilled to the initial water level;
comparing the number of times the tub is refilled with a predetermined number;
resetting the minimum water level to a second minimum water level based upon the comparison between the number of times the tub is refilled and the predetermined number;
repeating the step of supplying water to the washing machine to the initial water level;
measuring a new water level in the washing machine; and
re-filling water to the washing machine when the new water level is reduced to the second minimum water level.

10. The method as claimed in claim 1, wherein the comparing step includes determining whether the number of times water is re-supplied is greater than the predetermined number.

11. The method as claimed in claim 9, wherein the comparing step includes determining whether the number of times water is re-supplied is greater than the predetermined number.

12. The method as claimed in claim 9, wherein said resetting step is performed by increasing the set initial second water level if the water re-supply count is greater than the predetermined number.

* * * * *